US011193561B2

(12) United States Patent
Haupt et al.

(10) Patent No.: US 11,193,561 B2
(45) Date of Patent: Dec. 7, 2021

(54) DRIVE ASSEMBLY WITH LUBRICANT RESERVOIR

(71) Applicant: GKN Automotive Limited, Birmingham (GB)

(72) Inventors: Jan Haupt, Kürten (DE); Theodor Gassmann, Siegburg (DE); Maximilian Werkhausen, Cologne (DE)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 16/914,574

(22) Filed: Jun. 29, 2020

(65) Prior Publication Data

US 2021/0010568 A1 Jan. 14, 2021

(30) Foreign Application Priority Data

Jul. 8, 2019 (DE) .................. 10 2019 210 037.6

(51) Int. Cl.
*F16H 3/66* (2006.01)
*F16H 61/686* (2006.01)
*F16H 57/04* (2010.01)

(52) U.S. Cl.
CPC ........... *F16H 3/66* (2013.01); *F16H 57/0435* (2013.01); *F16H 57/0483* (2013.01);
(Continued)

(58) Field of Classification Search
CPC .............. F16H 61/0206; F16H 57/04; F16H 2057/0216; F16H 57/0483; F16H 57/045;
(Continued)

(56) References Cited

U.S. PATENT DOCUMENTS 8,764,599 B2  7/2014  Ekonen et al.
2014/0231209 A1*  8/2014  Nett ................. F16H 57/0483
192/85.01
(Continued)

FOREIGN PATENT DOCUMENTS

DE  10 2008 037 886 A1  2/2010
DE  102010039447 A1  2/2012
(Continued)

OTHER PUBLICATIONS

English translation of KR20190001653A; http://translationportal.epo.org; Apr. 27, 2021 (Year: 2021).*

*Primary Examiner* — Roger L Pang
(74) *Attorney, Agent, or Firm* — Bejin Bieneman PLC

(57) ABSTRACT

A drive assembly for a motor vehicle includes a housing having a transmission housing chamber, a reservoir, and a clutch housing chamber. At least one of the transmission housing chamber or the clutch housing chamber are fluidically connected to the reservoir. A transmission is disposed in the transmission housing chamber. A clutch is disposed in the clutch housing chamber. The clutch is drivingly connected to the transmission. An actuator has an actuating element engaged with the clutch. The clutch is moveable by the actuating element between a disengaged position and an engaged position. A valve is operatively connected to the actuating element of the actuator to allow lubricant flow from the reservoir to at least one of the transmission housing chamber and the clutch housing chamber when the clutch is in the engaged position and to prevent lubricant flow from the reservoir when the clutch is in the disengaged position.

21 Claims, 8 Drawing Sheets

(52) U.S. Cl.
CPC ....... *F16H 61/686* (2013.01); *F16H 57/0445* (2013.01); *F16H 57/0473* (2013.01)

(58) Field of Classification Search
CPC .. F16H 57/0473; F16H 57/57; F16H 57/0445; F16H 57/0423; F16H 57/0424; F16H 57/0453; B60K 17/3462; B60K 17/34; B60K 17/346; F16D 23/12; F16D 13/74
USPC ........................................................ 475/160
See application file for complete search history.

(56) References Cited

U.S. PATENT DOCUMENTS

| | | |
|---|---|---|
| 2017/0152936 A1 | 6/2017 | Pritchard et al. |
| 2017/0356535 A1* | 12/2017 | Peura ...................... F16D 13/52 |
| 2018/0058513 A1 | 3/2018 | Long et al. |
| 2018/0347640 A1* | 12/2018 | Lundstrom ........... F16D 25/123 |
| 2018/0347687 A1* | 12/2018 | Waser ..................... F04B 9/042 |
| 2020/0079212 A1* | 3/2020 | Legl ................... F16H 57/0424 |
| 2020/0362924 A1* | 11/2020 | Desing .................... F16D 25/10 |

FOREIGN PATENT DOCUMENTS

| | | |
|---|---|---|
| DE | 102012219182 A1 | 5/2014 |
| DE | 102016200009 B3 | 1/2017 |
| DE | 10 2016 121 963 A1 | 6/2017 |
| EP | 3354920 A1 | 8/2018 |
| KR | 1020190001653 A | 1/2019 |
| WO | 2010017882 A1 | 2/2010 |

\* cited by examiner

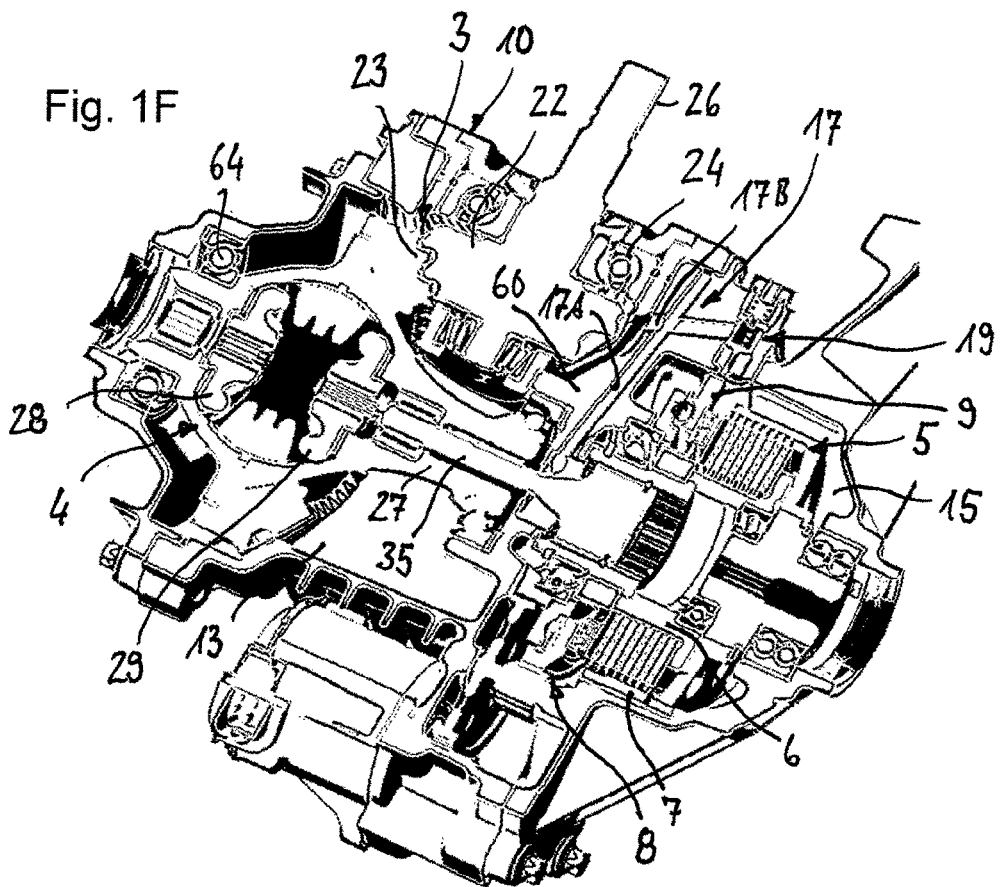
Fig. 1F
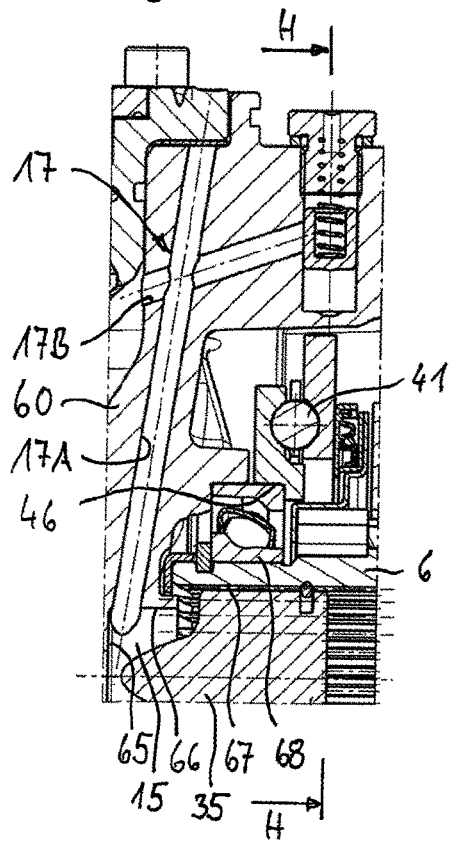
Fig. 1G
Fig. 1H

DRIVE ASSEMBLY WITH LUBRICANT RESERVOIR

CROSS-REFERENCE TO RELATED APPLICATION

This application claims priority to German Application No. DE 10 2019 210 037.6, filed on Jul. 8, 2019, which application is hereby incorporated herein by reference in its entirety.

BACKGROUND

Drive assemblies or arrangements including a transmission and a controllable clutch are used in drivelines for power transmission between several drive components, such as drive shafts and/or drive gears. They enable the transmission of a rotary motion, variable torque transmission, and/or the connection or disconnection of drivelines.

Such drive assemblies including a clutch are used, for example, in drivelines of multi-axle driven motor vehicles, in particular, drivelines with a permanently driven first drive axle and an optionally drivable second drive axle. Such drive concepts with a drive axle that is optionally drivable according to the requirements are also known as hang-on, on-demand, or disconnect systems.

From DE 10 2016 121 963 A1, corresponding to US 20170152936 A, a power take-off unit with a clutch is known. The clutch can be operated by an actuator and comprises two clutch elements which can be engaged with each other. A valve is connected to the actuator and provides a supply of lubricant from a reservoir in the unit to the clutch when the two clutch elements are engaged.

A rear axle differential with a clutch is known from KR 1 0201 9001 653 A. The fluid supply to the rear axle differential and the clutch is affected depending on the driving mode of the vehicle, wherein lubricant is optionally supplied to the clutch or lubricant contained in the clutch is removed to reduce drag torque.

From U.S. Pat. No. 8,764,599 B2 a drive arrangement with a power transmission device for transmitting drive torque to a front driveline and a rear driveline is known. The rear driveline comprises a prop shaft, the front end of which is connected to a front angle drive arrangement and the rear end of which is connected to a rear angle drive arrangement. The rear angle drive arrangement comprises an angle drive and a differential connected thereto that transmits an introduced rotational movement to two sideshafts. A friction clutch is provided between the differential and one of the sideshafts to selectively transmit torque.

From DE 10 2008 037 886 A1, corresponding to WO 2010/017882 A1, a drive arrangement for a multi-axle driven motor vehicle is known. The drive arrangement comprises an optionally drivable driveline with a prop shaft as well as a coupling in front and a coupling behind the prop shaft. The prop shaft can be switched torque-free by opening the two couplings.

From EP 3 354 920 A1 a clutch arrangement with a wet-running friction clutch for the driveline of a motor vehicle is known. The friction plate clutch comprises an inner plate carrier with inner plates and an outer plate carrier with outer plates. The inner plate carrier has bores through which oil can flow to the plate packet. The orifices of the bores are each covered by orifice portions of a movable setting member. An actuating device for actuating the clutch acts on the setting member to control the oil flow through the bores of the inner plate carrier.

In general, a sufficient oil supply to transmission units and friction plate clutches is important in order to sufficiently lubricate components rotating relative to each other and to dissipate heat generated by friction. On the other hand, a high oil volume flow leads to drag torques and thus to undesired losses. The efficiency of transmissions is negatively affected by splash losses. Active oiling systems such as dry sump lubrication by means of an oil pump can prevent this effect, but require increased effort, such as additional components and control technology.

SUMMARY

The disclosure relates to a drive assembly with a transmission and a controllable clutch and an oiling system for a driveline of a motor vehicle. The present disclosure proposes a drive assembly with a transmission and a clutch, which allows the oil supply to be adapted to the demand and which has a high efficiency and low power losses.

The drive assembly for the driveline of the motor vehicle comprises the transmission; the clutch drivingly connected to the transmission and designed for variably transmitting torque between a clutch input part and a clutch output part; an actuator for controlling the clutch, the actuator having an actuating element acting on the clutch for adjusting the transmittable torque; a housing with a transmission housing chamber in which at least part of the transmission is accommodated, a reservoir for temporarily storing lubricant and a clutch housing chamber in which at least part of the clutch is accommodated, wherein the transmission housing chamber and/or the clutch housing chamber is fluidically connected to the reservoir so that during operation lubricant is supplied into the reservoir; and a valve for controlling a lubricant flow from the reservoir to the transmission housing chamber and/or to the clutch housing chamber, the valve being operatively connected to the actuating element of the actuator in such a way that when the clutch is engaged, the valve is open so that lubricant flows from the reservoir to at least one of the transmission housing chamber and the clutch housing chamber, and, when the clutch is disengaged, the valve is closed so that lubricant is stored in the reservoir.

An advantage of the drive assembly is that the reservoir, together with the controllable inflow to the transmission housing chamber and/or clutch housing chamber, allows that the oil supply can be adapted according to the requirements. When the clutch is disengaged, i.e. when it is open, part of the lubricant is temporarily stored in the reservoir, so that the amount of lubricant circulating in the transmission and the splashing losses are reduced. In this way, high efficiency and low power losses of the drive assembly are achieved. The reservoir is filled by one or more rotating components of the transmission, for example, a gear, and/or the at least one clutch, for example, a plate carrier. During operation of the drive assembly, transmission parts and clutch parts rotate in their respective housing chambers and, due to the rotary motion, take lubricant with them and convey or fling it towards the reservoir. The lubricant is temporarily stored in the reservoir and returns to the circuit when the valve is open.

Depending on the configuration of the individual components, several options are possible for the arrangement of the valve and the fluidic backflow connection between the reservoir and the transmission housing chamber and/or the clutch housing chamber. According to a first example, the reservoir can be fluidically connected only to the transmission housing chamber, while the clutch housing chamber is fluidically separated therefrom. In this example, engaging the clutch leads to a release of the lubricant quantity temporarily stored in the reservoir in order to lubricate the transmission. A lubricant supply of the clutch remains unaffected by this. This design is conceivable, for example, for assemblies in which the transmission and the clutch use separate lubricants, or in which the clutch is designed as a dry-running clutch. According to a second example, the reservoir can be fluidically connected only to the clutch housing chamber, while the transmission housing chamber is fluidically separated therefrom. In this example, engaging the clutch leads to a release of the lubricant quantity temporarily stored in the reservoir for lubricating the clutch, wherein the lubricant supply and, the lubricant quantity of the transmission remain unaffected. When the clutch is engaged, i.e., when it is in a torque transmitting condition, the full amount of lubricant is available. When the clutch is disengaged, lubricant is temporarily stored in the reservoir. This design is particularly suitable for wet-running clutches in order to reduce drag losses when disengaged. According to a third example, which is a combination of the first and second examples, the reservoir can be fluidically connected to both the clutch housing chamber and the transmission housing chamber. In this example, engaging the clutch leads to the release of the lubricant quantity temporarily stored in the reservoir for lubricating the clutch and the transmission. In an engaged position, the full amount of lubricant is thus available in the transmission and in the clutch, and in a disengaged position, lubricant is temporarily stored in the reservoir.

In the second and third examples, the reservoir is fluidically connected to the clutch housing chamber so that lubricant can flow from the reservoir to the clutch housing chamber. The chambers through which the lubricant circulates during operation of the assembly can be arranged in series. A first chamber is formed in a housing portion in which the transmission is accommodated. The reservoir forms a second chamber, and a third chamber is formed in a housing portion in which the clutch is arranged. The chambers are fluidically connected with each other, so that during operation a lubricant flow is established from the first chamber to the second chamber and—when the clutch is engaged—to the third chamber.

A special feature of the lubrication concept is that the lubricant flow to the transmission and/or clutch is controlled via the valve, which is activated by the movement of the actuator. When the clutch is engaged, i.e. when it transmits torque, the valve is opened and the oil flow to the transmission housing chamber and/or clutch housing chamber is released. This means that the full volume of lubricant is available for lubricating and cooling the rotating components. When the clutch is disengaged, i.e. when it is open and does not transmit any torque, the valve is closed so that a backflow of lubricant is interrupted, and the reservoir fills with lubricant. As a result, the lubricant level in the transmission housing chamber and/or the clutch housing chamber is constantly falling, so that the splash losses are reduced.

According to an example, the volume of the reservoir can temporarily store at least 25% of the total lubricant volume of the drive assembly, in particular at least 35%, preferably at least 45% or more. As a result, when the clutch is disengaged, the quantity of lubricant for the transmission and splash losses can be significantly reduced. The upper limit depends on how much lubricant is required for an adequate cooling and lubrication when the clutch is disengaged. For example, the volume of the reservoir can amount to a maximum of up to 85%, in particular up to 75% or also up to 65% of the total volume of lubricant.

A drive assembly disclosed herein can be located anywhere in the driveline of a motor vehicle in the power path between a power source and the wheels. For example, the drive assembly may include at least one transmission from the group of multi-step transmission, angle drive, power take-off unit (PTU) and differential drive. Furthermore, the drive assembly can be located in the power path upstream or downstream of a propeller shaft.

The oil in the drive assembly is used to dissipate the heat generated by friction and to lubricate the components coming into frictional contact with each other. In this respect the oil can also be referred to as coolant and lubricant.

According to an example, the valve can be arranged in a fluid line or channel between the lubricant reservoir and the clutch housing chamber and/or transmission housing chamber. The fluid line connects the reservoir fluidically with the clutch housing chamber and/or transmission housing chamber and can therefore also be called a fluid connection. The valve may have a control element which is at least indirectly movable by the actuator. When the actuator is operated to engage the clutch, i.e., to control it in a torque transfer mode, the control element is moved in the opening sense to enable the fluid connection. For this purpose, a spring may be provided which pretensions the control element against the actuating element in the opening sense. By operating the actuator to engage the clutch, the actuating element releases the control element so that the spring moves the control element to an open position. The fluid connection is thus opened, so that lubricant can flow from the reservoir to the clutch housing chamber and/or transmission housing chamber. By actuating the actuator to disengage the clutch, the actuating element moves the control element against the spring force back into a closed position, so that lubricant is stored in the reservoir.

A fluid channel may be provided between the transmission housing chamber and the reservoir, wherein, in an installed condition, an opening of the fluid channel into the reservoir is at a higher level than an opening of another fluid channel from the reservoir to the clutch housing chamber. Furthermore, in an installed condition, the reservoir can be arranged higher than a lubricant sump of the transmission.

According to an example, a return flow line from the reservoir to the transmission may be provided, which is at least indirectly fluidically connected to a clutch inflow. This means that, when the clutch inflow is open, a partial quantity of lubricant flows back directly to the transmission through the transmission return flow line.

The transmission of the drive assembly may be an angle drive with a rotatingly drivable pinion and a ring gear engaging therewith, which can be designed as a crown gear, for example. The ring gear is mounted in the transmission housing chamber so as to be rotatable about an axis of rotation, wherein a collecting device may be provided in the transmission housing chamber in order to collect lubricant thrown off the ring gear and to feed the collected lubricant to the fluid channel to the reservoir.

The drive assembly can have a housing with several housing portions. A first housing chamber may be provided to accommodate the transmission, and parts thereof, and a second housing chamber to accommodate the clutch, and parts thereof, wherein the first and second housing chamber are separated by an intermediate wall having an opening. An intermediate shaft can extend through the opening, which drivingly connects the transmission with the clutch. The intermediate shaft can be rotatably mounted in the intermediate wall by a shaft bearing, and the ring gear can be rotatably mounted in the intermediate wall by another bearing. The two bearings can be arranged on different sides of the intermediate wall. A fluid channel from the reservoir to the clutch housing chamber preferably opens in a ring section of the intermediate wall, more particularly, axially adjacent to a ring shoulder on the side facing the clutch housing chamber.

The actuator can be arranged coaxially to the intermediate shaft, in particular, axially between the intermediate wall and the clutch. Preferably, the actuator includes a controllable actuator drive and an actuating element which is moveable by said drive and which opens the control element of the valve when being moved to engage the clutch.

The actuator is configured and/or controllable to engage the clutch so that torque is transmitted between a clutch input and clutch output, or to disengage the clutch so that the clutch parts are disconnected from each other and do not transmit torque. For controlling the clutch in the engaging or disengaging sense, a rotary drive with a rotation-translation converter may be provided, for example, so that a rotary movement in a first rotary direction effects loading of a clutch pressure element and thus engaging of the clutch, while a rotary movement in a second rotary direction effects unloading of the clutch pressure element and thus disengaging the clutch. The actuator can be, for example, electromotive, electromagnetic, or hydraulic.

According to an example, the actuator can comprise a ramp mechanism with a supporting ring which is axially supported against a stationary component and a setting ring which is axially displaceable, and a drive unit for rotating one of the supporting ring and the setting ring relative to the other one of the supporting ring and the setting ring. The supporting ring and/or the setting ring have a ramp structure so that a rotary movement of the drive unit is converted into an axial movement of the setting ring. Additionally, the ramp mechanism can be designed as a ball ramp mechanism, wherein the two rings each have a plurality of circumferentially extending ball grooves with variable depth on their facing end faces. Pairs of opposing ball grooves each accommodate a respective ball, via which the two rings are supported against each other. By rotating one ring relative to the other ring, the balls run into flatter or deeper groove portions, so that the axial position of the clutch pressure element and thus the transmittable torque of the clutch can be set or adjusted as required. The setting ring may also be referred to as adjusting ring. To rotate one of the rings relative to the other, an electric motor can be provided, for example, which may have a pinion to engage in a tooth structure on an outer surface of the rotatable ring.

According to an example, the ring that is rotatingly drivable by the drive unit can form the actuating element which interacts with the control element of the valve. The actuator has a dual function, firstly to operate the clutch and secondly to control the circulating oil quantity and/or the oil supply to the transmission and clutch. When the clutch is moved to the engaged position, the valve control element is also moved at the same time, thereby opening the inflow from the reservoir to the clutch housing chamber. Accordingly, the maximum oil volume flow is available in operating conditions in which the clutch is engaged, in particular, under slip torque transmission. The rotating clutch parts are well lubricated, and the heat generated therein is effectively dissipated via the increased oil flow rate.

To move the valve control element, the actuating element may have an actuating contour formed such that moving the actuating element to engage the clutch causes the control element to move for opening the valve. In an example wherein the actuator is designed as a ball ramp arrangement, the actuating element is an actuating ring which includes the circumferentially extending ball grooves of variable depth on an end face and which includes the operating contour with a variable radius over the circumference on a peripheral surface thereof. Thus, rotating the actuating ring causes the valve to open and the clutch to engage. According to another example, a hydraulic actuator can also be used. The hydraulic actuator may actuate the lubrication control valve by a small first piston and, in case of higher hydraulic pressures, may load the clutch by a second piston.

The drive assembly may also include a differential drive, which may be located in the transmission housing chamber. The differential drive is designed to transmit a torque introduced by the upstream gearing unit to two output parts. For this purpose, the differential drive includes a differential carrier which is connected to the ring gear of the angle drive and is mounted in the transmission housing chamber so as to be rotatable about the axis of rotation, several differential gears which are rotatably mounted in the differential carrier and rotate together therewith about the axis of rotation, and two sideshaft gears which are arranged coaxially to the axis of rotation and engage the differential gears.

According to another example, the drive assembly can also have a second clutch instead of a differential drive, which second clutch may be drivingly connected to the transmission. In this example, a transmission output part drives the clutch input parts of the first and second clutch. In the example with two clutches, which can also be called Twinster, a second actuator is provided to control the second clutch. The first actuator for the first clutch and the second actuator for the second clutch can be controlled separately, so that the torque transmittable to the respective sideshaft can be set individually. The second clutch and the second actuator can be designed in the same manner in terms of structure and mode of operation as the first clutch and the first actuator, respectively. This means that all the features described for one of the components mentioned can also apply to the second component.

The first and/or second clutch is preferably designed as a wet-running friction plate clutch and includes an inner plate carrier, to which inner plates are connected in a rotationally fixed and axially movable manner, and an outer plate carrier, to which outer plates are connected in a rotationally fixed and axially movable manner. The inner plates and the outer plates together form a plate packet which, when subjected to axial pressure, transmits torque between the plate carriers.

The oil flowing from the reservoir into the clutch housing chamber can reach the plate pack for cooling and lubricating purpose through bores in one of the plate carriers. From the clutch housing chamber the oil can flow back into the transmission housing chamber through the opening provided in the intermediate wall. It is understood that the flowing oil can also cool and lubricate other moving mechanical components such as bearings and/or seals.

SUMMARY OF THE DRAWINGS

The disclosure is explained below using the drawing figures. Herein, it shows:

FIG. 10 shows the arrangement of the lubrication chambers of the drive assembly of FIG. 1A in a perspective view;

DETAILED DESCRIPTION

Figure 1A:
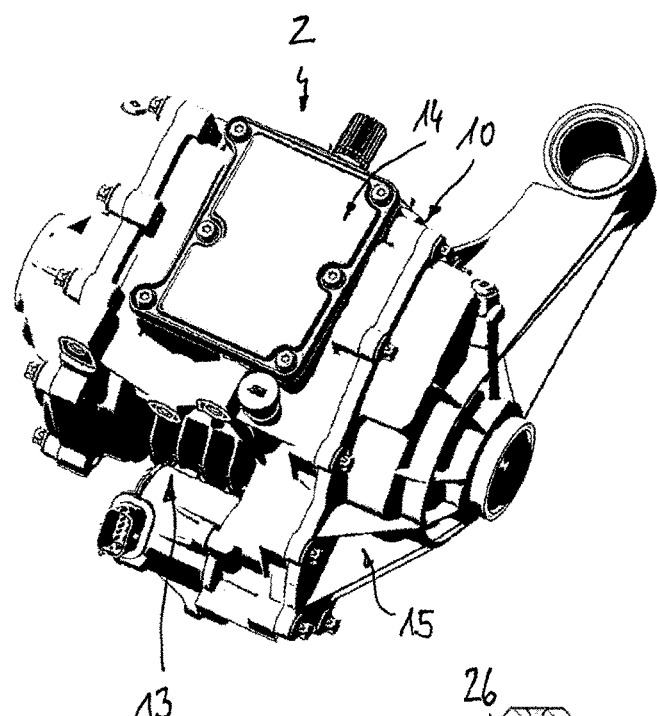
FIG. 1A shows an example drive assembly in a perspective view.

FIGS. 1 to 6, which are described together below, show a drive assembly 2 according to the disclosure for a driveline of a motor vehicle. In the present example, the drive assembly 2 includes a first gearing 3, which can also be designated as a transmission and is designed, in particular, in the form of an angle drive, a second gearing 4 arranged downstream in the power path, which is optional and is designed here in the form of a differential drive, and a clutch 5, which is drivingly connected to the first and second gearing 3,4, respectively, and is designed for variable torque transmission between a clutch input part 6 and a clutch output part 7. An actuator 8 with an actuating element 9 is provided to control the clutch 5. The actuating element 9 acts on the clutch 5 to adjust the torque that can be transmitted between the clutch input and output parts 6, 7.

The drive assembly 2 further includes a housing 10 with a transmission housing chamber 13 in which the first gearing 3 and parts thereof are accommodated, a reservoir 14 and a clutch housing chamber 15 in which the clutch 5 is accommodated. The transmission housing chamber 13 is fluidically connected to the reservoir 14, in particular, via a fluid channel 12, so that during operation lubricant is delivered from the transmission housing chamber 13 into the reservoir 14. The reservoir 14 is fluidically connected to the clutch housing chamber 15, in particular, via one or more further fluid channels 16, 17, 18, so that lubricant can flow from the reservoir 14 to the clutch housing chamber 15. The reservoir 14 may be designed to temporarily store at least 25% of the total lubricant, for example, about 50% of the total lubricant contained in the drive assembly 2.

Oil is provided in the housing 10 of drive assembly 2, which serves to dissipate the heat generated by friction and to lubricate the components coming into frictional contact with each other. A switchable valve 19 is provided to control the flow of lubricant from the reservoir 14 to the clutch housing chamber 15. The valve 19 is operatively connected to the actuating element 9 of the actuator 8 in such a way that, when the clutch 5 is engaged, the valve 19 is open so that lubricant flows from the reservoir 14 to the clutch housing chamber 15, and, when the clutch 5 is disengaged, the valve 19 is closed so that lubricant is temporarily stored in the reservoir 14.

As shown in FIG. 10, the chambers 13, 15 and the reservoir 14 are arranged in series and are fluidically connected to each other, so that during operation there is a flow of lubricant from the transmission housing chamber 13 to the reservoir 14 and—in case the clutch 5 is engaged—to the clutch housing chamber 15. The flow of lubricant to the clutch 5 is controlled by the valve 19, which is operated by the movement of the actuator 8. When the clutch 5 is engaged, i.e. when it transmits torque, the valve 19 is opened and the oil flow to the clutch housing chamber 15 is enabled. This means that the full volume of lubricant is available for lubricating and cooling the rotating components. When the clutch 5 is disengaged, i.e. when it is open and does not transmit torque, the valve 19 is closed so that the backflow of lubricant is interrupted and the reservoir 14 fills with lubricant. As a result, the lubricant level in the transmission housing chamber 13 drops steadily, so that the splash losses are low.

The first gearing 3 includes a first gear 22 and a second gear 23, which meshingly engage each other. In the present configuration as an angle drive 3, the first gear 22 is designed as a pinion and the second gear 23 as a ring gear. The first gear 22 can be integrally formed with a shaft journal and can be mounted in the housing 10 so as to be rotatable about an axis of rotation by one or more bearings 24, 25. Torque can be introduced via splines 26 at the end of the journal, for example, from a driveline that is drivable by an electric machine and/or an internal combustion engine.

The second gear 23 is firmly connected to an input part 27 of the differential drive 4, for example, by a screwed and/or welded connection. The differential drive 4 distributes a drive torque introduced from the second gear 23 into the input part 27 equally to two output parts 28, 29. The differential drive 4 includes a differential carrier as the input part 27, several differential gears 30 which jointly rotate with the differential carrier 27 around a rotational axis A2, and two sideshaft gears as output parts 28, 29 which meshingly engage the differential gears 30 and are rotatably accommodated in the differential carrier 27 coaxially to the rotational axis A2. A left sideshaft gear 28 is drivingly connected to a left shaft 34 for torque transmission. A right sideshaft gear 29 is connected via an intermediate shaft 35 and the clutch 5 to a right shaft 36 for torque transmission. The outer ends of shafts 34, 36 can be connected to vehicle wheels via sideshafts 92, 92' in order to transmit torque to the wheels.

Figure 1B:
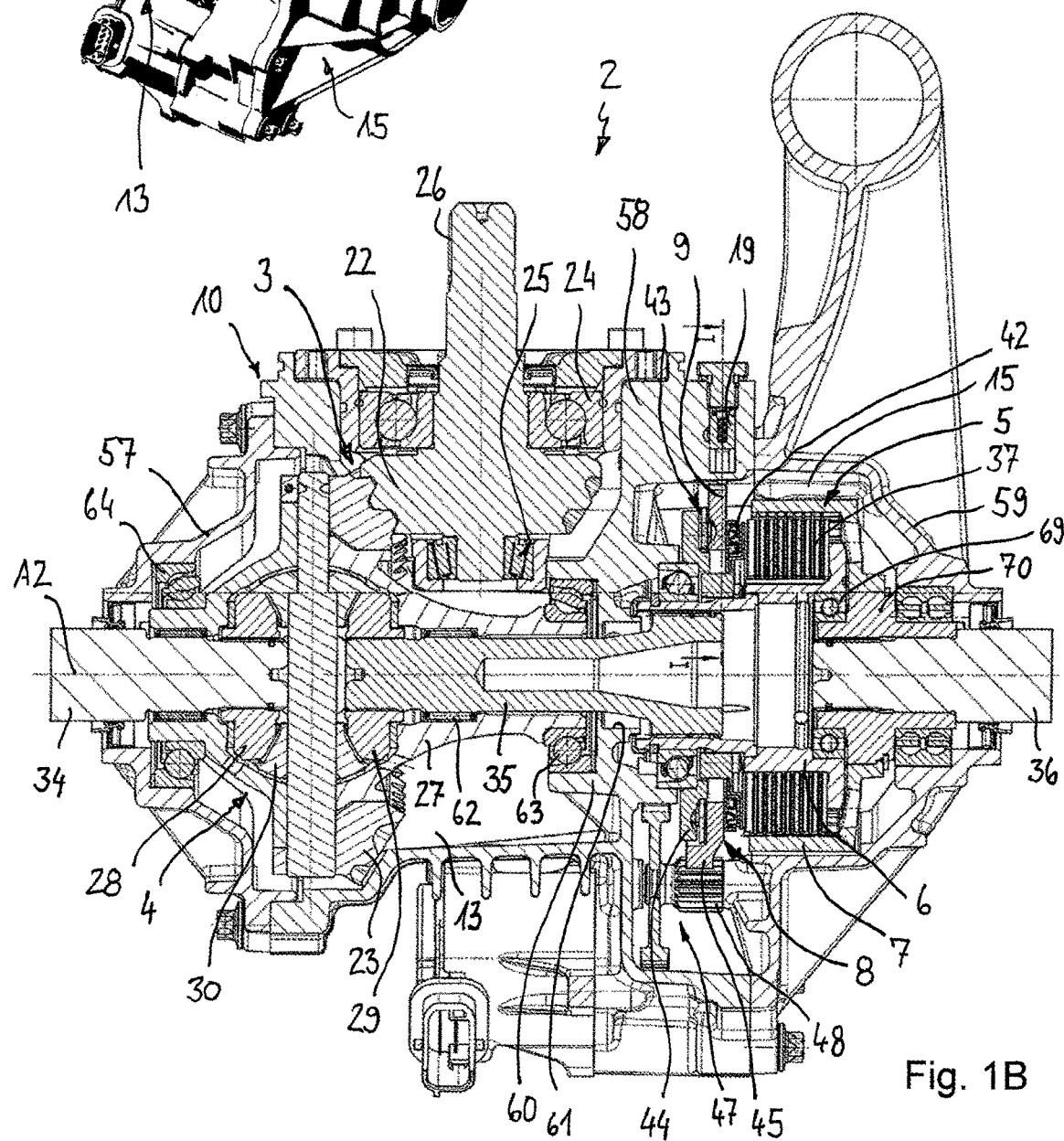
FIG. 1B shows an actuator assembly from FIG. 1A in a longitudinal section.
Figure 1C:
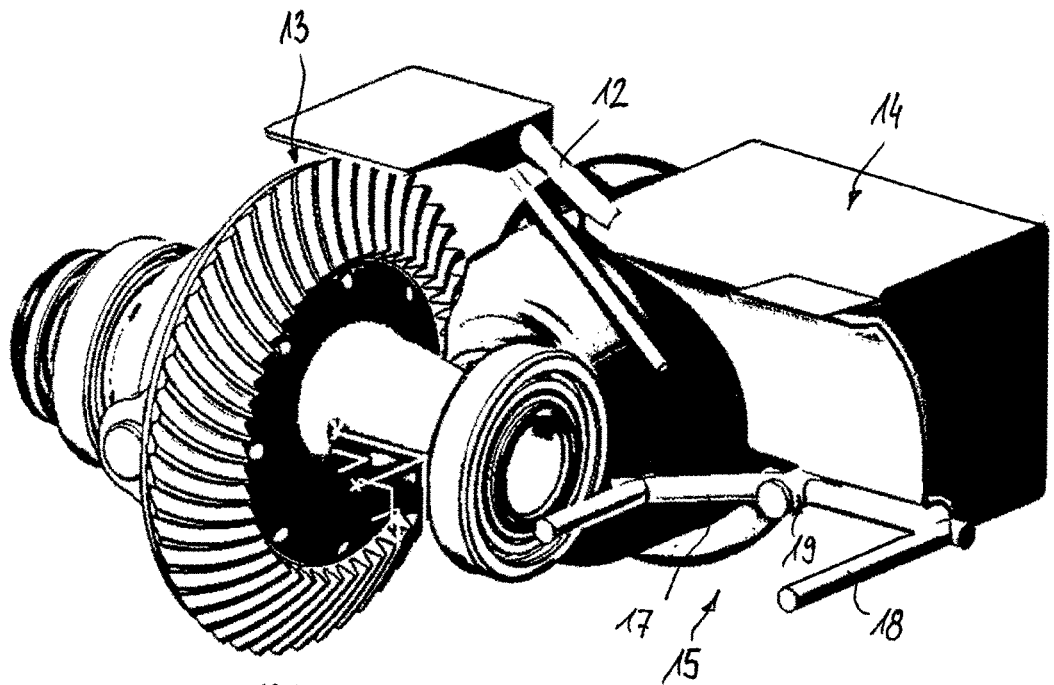
FIG. 1D shows the drive assembly of FIG. 1A in a section through a reservoir.
FIG. 1E shows a detail of the sectional view of FIG. 1D in an enlarged view.
FIG. 1F shows the actuator assembly of FIG. 1A in a further longitudinal section.
FIG. 1G shows a detail of the sectional view of FIG. 1F in an enlarged view.
FIG. 1H shows the arrangement of FIG. 1G in a cross-section according to the sectional line H-H.
Figure 1D:
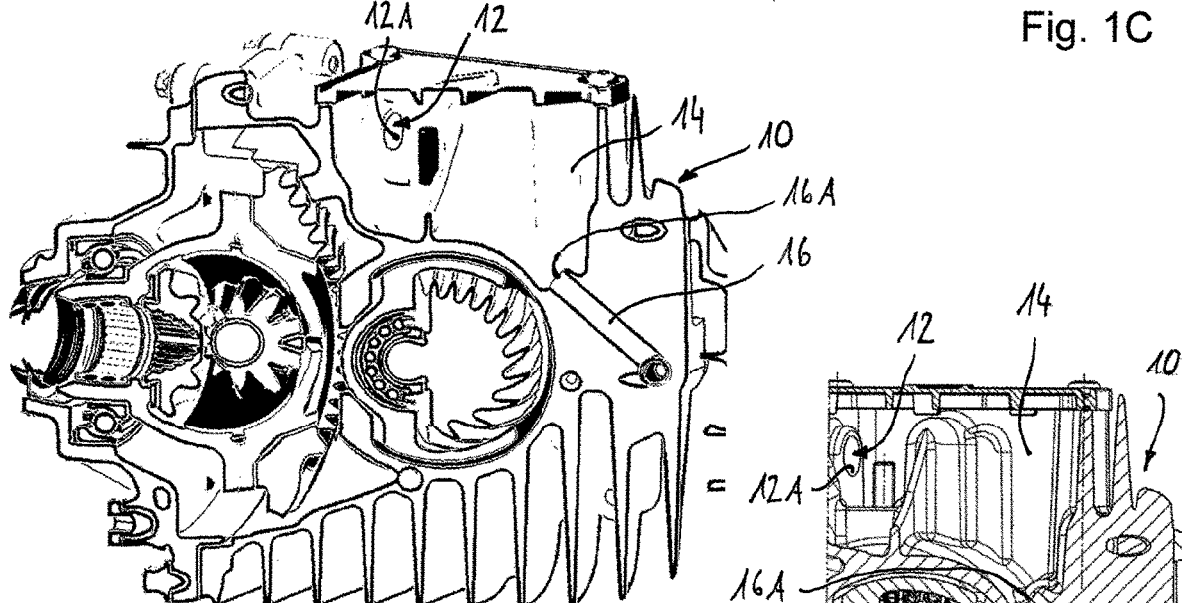
Figure 1E:
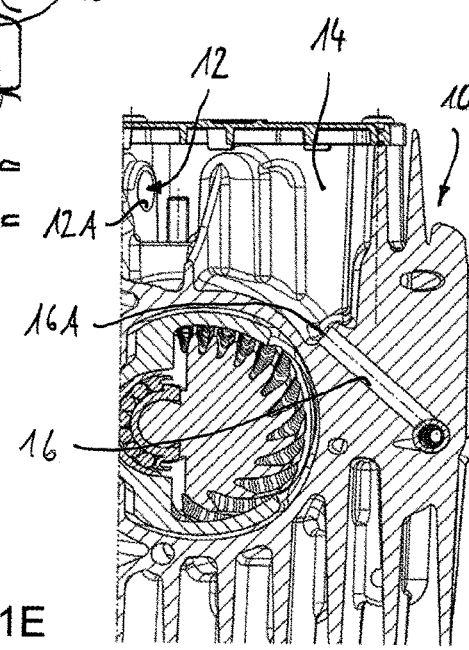

As shown in FIG. 1B, the controllable clutch 5 is located in the power path between the differential drive 4 and the right shaft 36. A first function of the clutch 5 is that it allows the drive torque for driving the drive axle to be adjusted depending on the determined requirement (target torque). Furthermore, the shafts 34, 36, the associated drive axle on the one side, and the drive source on the other, can be connected or disconnected by clutch 5 as required. The clutch 5 is designed in the form of a friction clutch, which allows variable adjustment of the torque transmittable between the clutch input part 6 and the clutch output part 7. In the closed condition, the right shaft 36 is connected to the intermediate shaft 35 of the differential drive 4 for transmitting torque. When the clutch 5 is in the disengaged position, the right shaft 36 is mechanically separated from the differential drive 4, so that no torque can be transmitted to the vehicle wheels. Between the engaged position and the disengaged position, the clutch 5 can be adjusted continuously to any intermediate position so that the torque transmitted to the right and left shafts 34, 36 can be adjusted and controlled accordingly.

The friction clutch 5 includes an inner plate carrier as input part 6, to which inner plates are connected in a rotationally fixed and axially movable manner, an outer plate carrier as output part 7, to which outer plates are connected in a rotationally fixed and axially movable manner. The outer plates and inner plates are arranged axially alternately and together form a plate packet 37. The plate packet 37 is axially supported in a first axial direction against a supporting plate 38. In the present example, the supporting plate 38 is integrally formed with the inner plate carrier 6 without being restricted thereto. A pressure plate 39 that is axially movable by the controllable actuator 8 is provided to load the plate packet 37.

The torque to be transmitted by clutch 5 can, for example, be determined in an electronic control unit (ECU) based on continuously sensed driving condition parameters of the motor vehicle. The electronic control unit transmits a corresponding control signal to the actuator 8, which then acts on the pressure plate 39 accordingly, so that the desired torque is transmitted by the clutch 5.

An axial bearing 42 is provided between the actuator 8 and the clutch 5, which allows axial force transmission from the actuator 8 to the pressure plate 39 while rotationally decoupling same from each other. The actuator 8 presently includes a ball ramp mechanism 43 and a drive unit (not shown). The ball ramp mechanism 43 has a supporting ring 44 axially supported and rotationally fixed to a housing part, and a setting ring 45 arranged opposite the supporting ring 44 and being rotatingly drivable about the axis of rotation A2. The supporting ring 44, with an inner seat 46 thereof, is mounted on a first bearing 68. The setting ring 45 is rotatingly drivable by the drive unit, for example, an electric motor, via a gear stage 47.

Ball grooves are circumferentially distributed in opposing faces of the supporting ring 44 and the setting ring 45. The ball grooves have a variable depth in a circumferential direction. In each pair of opposite ball grooves, a respective ball 41 is received. To operate the ball ramp mechanism 43, the setting ring 45 is rotated relative to the supporting ring 44 via the gear stage 47. The gear stage 47 includes a first gear wheel drivable by the drive unit and a pinion 48 connected thereto, with the pinion engaging teeth 49 of the setting ring 45.

As shown in FIG. 1H, the actuating element 9 for operating the valve 19 is fixed to the rotatable setting ring 45 or is integrally formed therewith. An actuating contour 11 of the actuating element 9, in the present example, is formed on an outer circumferential face, meaning that the valve 19 is oriented substantially radially and vertically relative to the axis of rotation A2 of the setting ring 45. It is understood that another design is also possible, for example, that the actuating contour 11 of the actuating element 9 is formed on an end face of the setting ring 45. In this case, the valve 19 would be arranged substantially parallel to the axis of rotation A2 of the setting ring 45.

The valve 19 includes an axially movable control element 20, which is seated in a valve chamber 21 in an axially movable manner. The control element 20, which may also be referred to as valve body, may be preloaded by a spring 52 in a direction towards the actuating element 9. The control element 20 includes a first section 53, which can close or release at least one fluid orifice 55 to the valve chamber 21, and a second section 54, the end of which is in contact with the actuating contour 11 of the actuating element 9. The first section 53 may have a larger diameter than the second section 54. The control element 20 is supported via the spring 52 against a support element 56, which closes the valve chamber 21 to the outside. For this purpose, the support element 56 is designed in the form of a screw member screwed into the housing 10, against which screw the spring 52 is supported. The spring preload can be adjusted by setting the screw-in depth of the screw member. When the clutch 5 is disengaged, the control element 20 is pressed radially outwards by the actuating contour 11 of the actuating element 9 against the pretensioning force of the spring 52, so that the valve 19 is closed. To engage the clutch 5, the actuating element 9 is rotated (counterclockwise in FIG. 1H), whereby the control element 20 slides along the actuating contour 11 and is pressed radially inwards by the spring 52. In this way the control element 20 gives way to the fluid orifice 55 to the valve chamber 21, so that lubricant drains from the reservoir 14 and the full lubricant quantity is available in the drive assembly 2.

The valve 19 controls the lubricant flow from the reservoir 14 to the clutch housing chamber 15, whereby the valve 19 is located in the fluid connection between the reservoir 14 and the clutch housing chamber 15. Specifically, a first fluid channel 16 can extend from the reservoir 14 to the valve chamber 21 and open into same. Furthermore, a second fluid channel 17 can extend from the valve chamber 21 to the clutch housing chamber 15. The second fluid channel 17 may have a first branch 17A which opens into the clutch housing chamber 15, and optionally a second branch 17B which opens into the transmission housing chamber 13. By moving the control element 20 in the valve chamber 21, the first fluid channel 16 from the reservoir 14 and the second fluid channel 17 can be selectively connected or disconnected fluidically as required. The valve 19 is operated automatically via the actuating element 9, i.e., by the actuator 8.

Figure 2A:
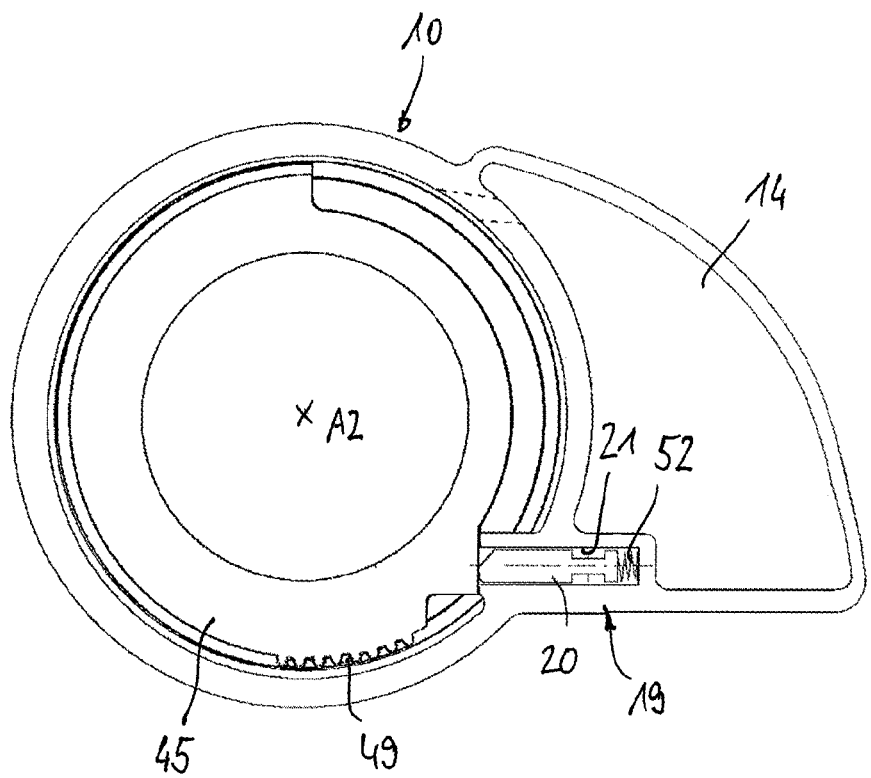
FIG. 2A shows the arrangement of FIG. 1H in a simplified representation with a valve closed.

By operating the drive unit, the setting ring 45 is rotated relative to the support ring 44. Depending on the direction of rotation of the drive unit, the setting ring 45 can be turned in a first direction of rotation or in the opposite second direction of rotation. In a first operating mode, the two rings 44, 45 are axially approached to each other. In this mode, the clutch 5 is disengaged and the valve 19 is fully closed. This state is shown in FIG. 2A.

Figure 2B:
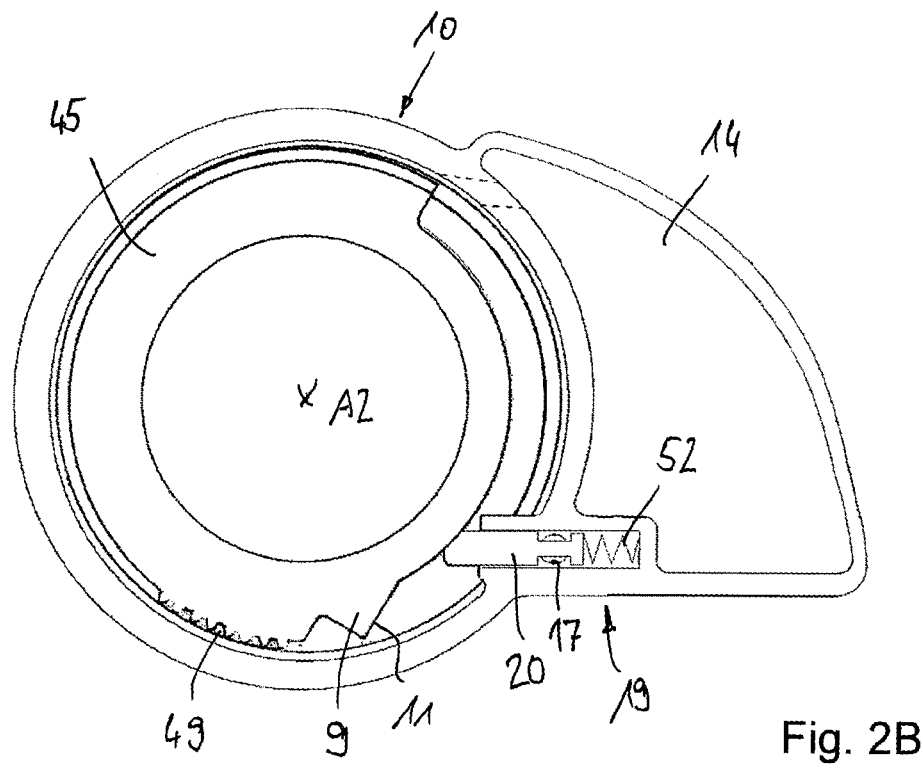
FIG. 2B shows the arrangement of FIG. 1H in a simplified representation with the valve open.

Starting from this operating condition, turning the setting ring 45 relative to the support ring 44 causes the balls 41 held in the ball grooves to run into portions of less depth, so that the setting ring 45 is moved axially towards the clutch 5. The setting ring 45 is axially supported via the axial bearing 42 against the pressure plate 39, which is moved accordingly towards the supporting plate 38. In this way, the clutch 5 is engaged and the valve 19 is opened. This state is shown in FIG. 2B. By loading the pressure plate 39, the plate packet 37 is loaded so that a torque is transmitted between the inner plate carrier 6 and the outer plate carrier 7. In this condition, the full amount of lubricant is available in the drive assembly 2 to cool and lubricate all rotating components.

If the drive unit and thus the setting ring 45 is again turned in the opposite second direction of rotation, the balls 41 held in the ball grooves run again into areas of greater groove depth, whereby the setting ring 45 is axially loaded and moved towards the support ring 44. In this way, the clutch 5 is disengaged again and the valve 19 is closed. Part of the total lubricant quantity is thus temporarily stored in the reservoir 14, so that the active lubricant quantity is reduced in this operating condition and splash losses are reduced.

Further details of the housing 10 and the lubricant system are explained below. The housing 10 can have several housing sections. Here, for example, three housing parts 57, 58, 59 are provided, without being restricted thereto. A central housing part 58 forms an intermediate wall 60 between the transmission housing chamber 13 and the clutch housing chamber 15. The intermediate wall 60 has an opening 61 through which the intermediate shaft 35 extends and drivingly connects an output part 7 of the differential 4 with the clutch 5. The intermediate shaft 35 is rotatably supported in the differential carrier 27 by a bearing 62, while the differential carrier 27 is in turn rotatably supported by a bearing 63 in the intermediate wall 60. With its opposite end portion, the differential carrier 27 is rotatably supported via a shaft bearing 64 in the cover-shaped housing part 57.

As shown in FIG. 1G, the second fluid channel 17 opens in an annular portion 66 of the intermediate wall 60 axially adjacent to a ring shoulder 65. In this way, the lubricant flows in opposite direction from the ring shoulder 65 towards the actuator 8 and the clutch 5 in order to cool and/or lubricate the rotating components. The intermediate shaft 35 is rotationally fixed to the inner plate carrier 6 via shaft splines 67. The inner plate carrier 6 is rotatably mounted via the first bearing 68 in the intermediate wall 60 and via a second bearing 69 on a sleeve part 70 connected to the right shaft 36.

Figure 3:
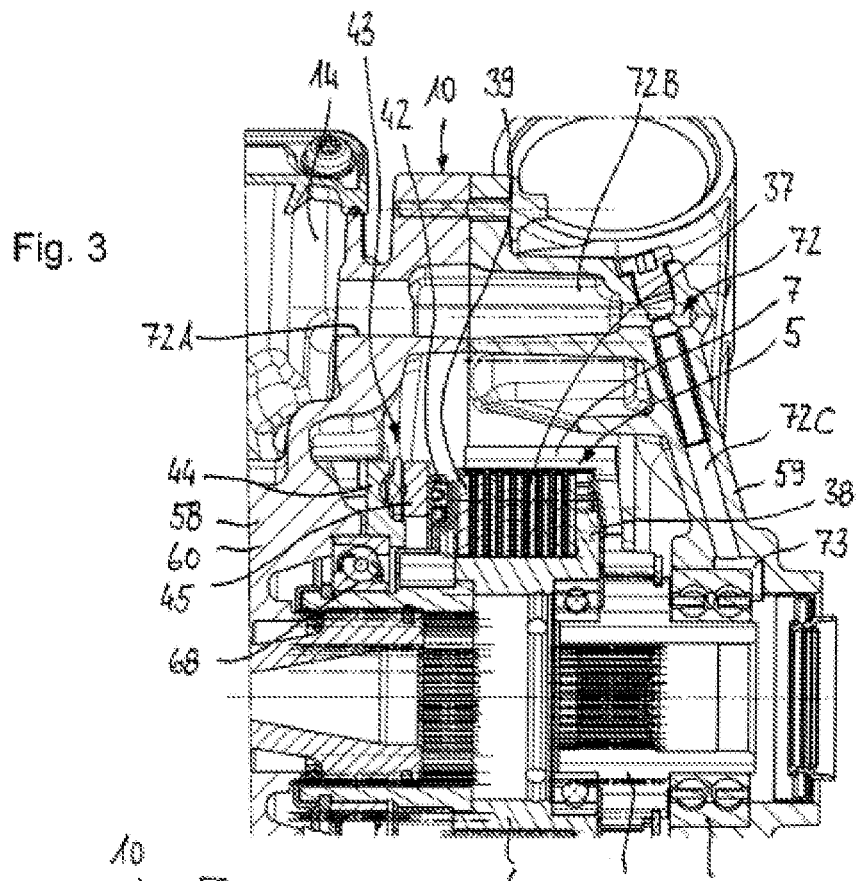
FIG. 3 shows another detail of the drive assembly of FIG. 1A in a sectional view.

As shown in FIG. 3, the sleeve part 70 is rotatably supported in the housing 10 by a shaft bearing 71. A fluid connection 72 is provided for lubricating the shaft bearing 71, which connects the reservoir 14 with an orifice 73 in the region of the shaft bearing 71. The fluid connection 72 includes several portions 72A, 72B, 72C, which are connected to each other. A first portion 72A is formed as a bore in a wall of the reservoir 14, which opens into a chamber-like second portion 72B. The portion 72B is connected to the orifice 73 via the line portion 72C.

Figure 4:
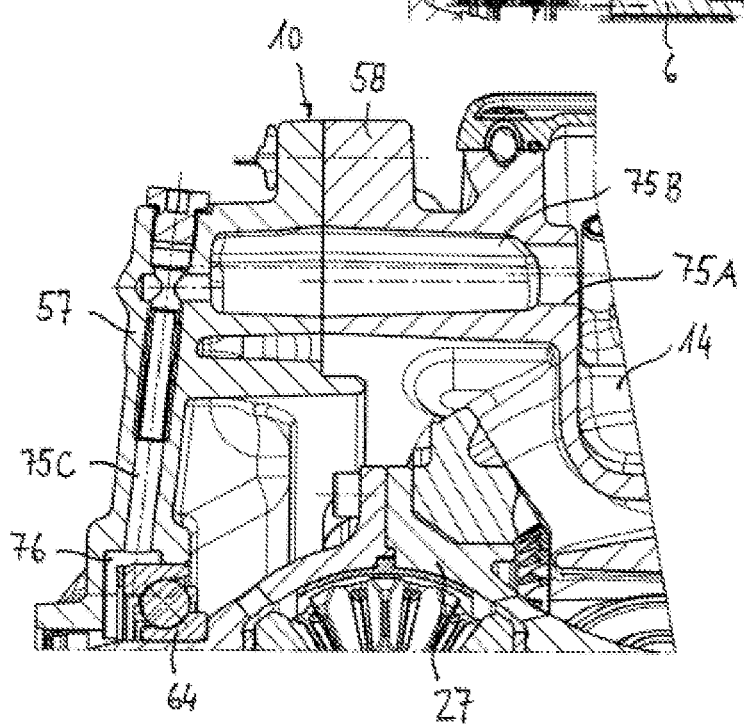
FIG. 4 shows another detail of the drive assembly of FIG. 1A in a sectional view.

As shown in FIG. 4, the differential carrier 27 on its side facing away from the angle drive 3 is rotatably supported in the housing 10 by the shaft bearing 64. A fluid connection 75 is provided for lubricating the shaft bearing 64, which connects the reservoir 14 with an orifice 76 in the region of the shaft bearing 64. The fluid connection 75 includes several portions 75A, 75B, 75C, which are connected to each other. A first portion 75A is designed as a bore in the wall of the reservoir 14, which opens into the chamber-like second portion 75B. The portion 75B is connected to the orifice 76 via the line portion 75C.

Figure 5A:
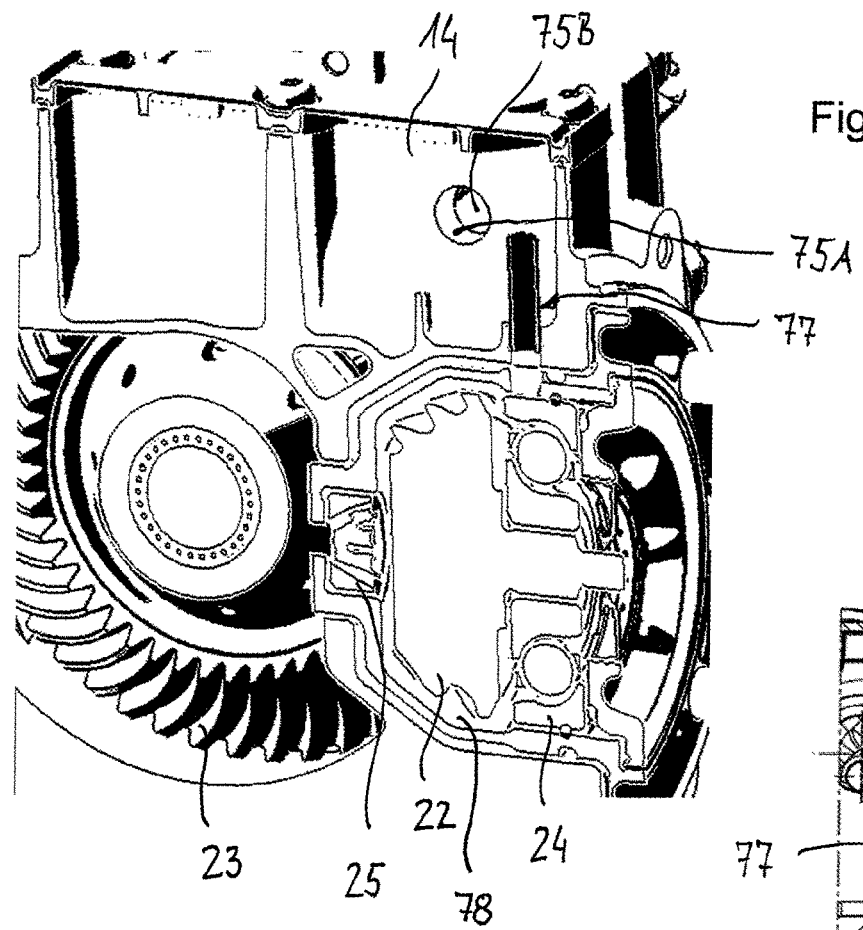
FIG. 5A shows a portion of the drive assembly of FIG. 1A in a perspective sectional view.
Figure 5B:
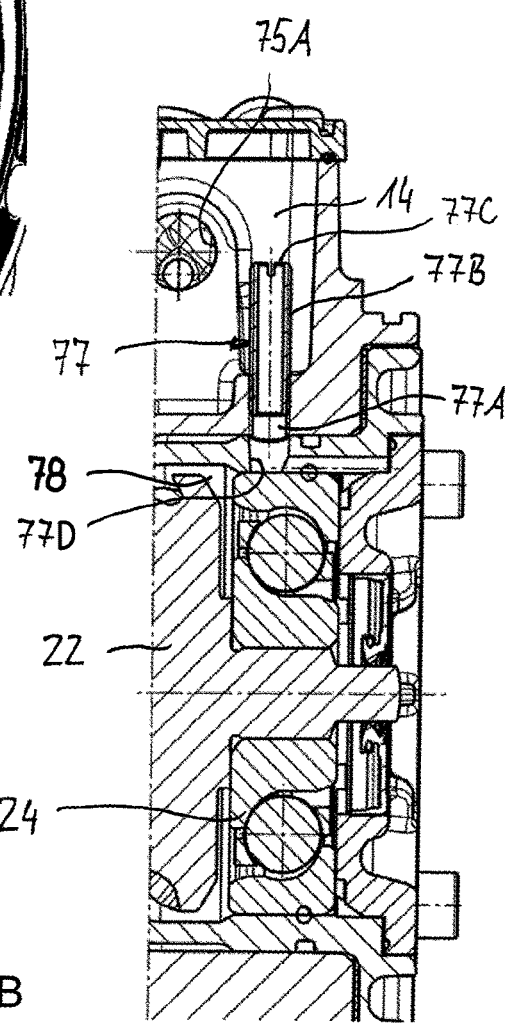
FIG. 5B shows a detail of FIG. 5A in an enlarged sectional view.

FIGS. 5A and 5B show another advantageous detail of the drive assembly 2. To lubricate the bearings 24, 25 of the pinion 22, a fluid connection 77 is provided, which connects the reservoir 14 with a pinion chamber 78. The fluid connection 77 includes a bore 77A in a lower wall of the reservoir 14, into which a sleeve 77B is inserted. If the level of lubricant in the chamber exceeds the top end 77C of the sleeve 77B, the lubricant flows through the sleeve 77B, bore 77A, and opening 77D into the pinion chamber 78 to lubricate the rotating components.

Figure 6A:
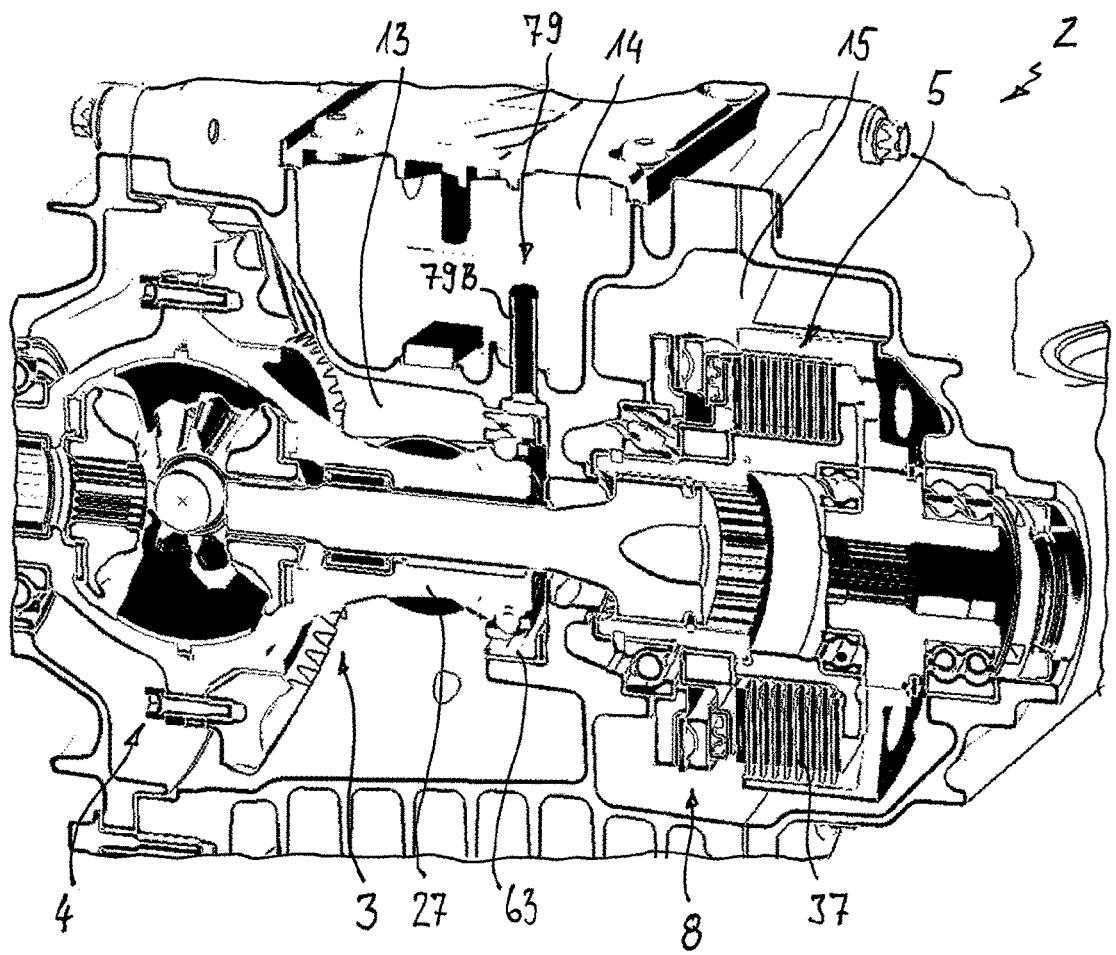
FIG. 6A shows the drive assembly of FIG. 1A in a further perspective sectional view.
Figure 6B:
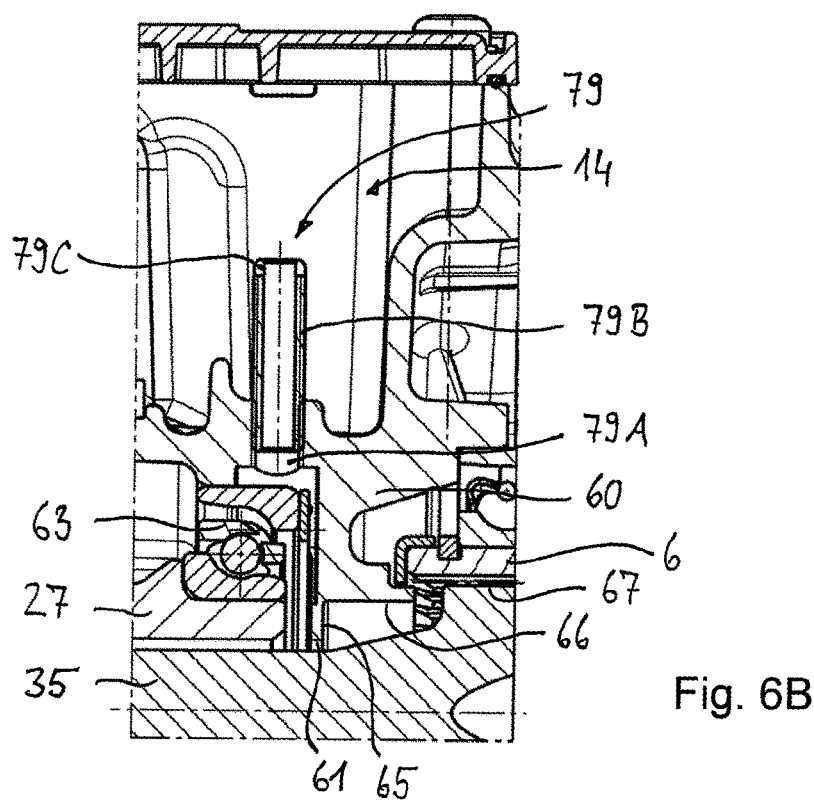
FIG. 6B shows a detail of FIG. 6A in an enlarged sectional view.

FIGS. 6A and 6B show another advantageous detail of the drive assembly 2. For lubricating the bearing 63 of the differential carrier 27 a fluid connection 79 is provided, which connects the reservoir 14 with the transmission housing chamber 13. The fluid connection 79 includes a bore 79A in the lower wall of the reservoir 14, into which a sleeve 79B is inserted. When the level of lubricant in the chamber exceeds the top end 79C of sleeve 79B, lubricant flows through the sleeve 79B and bore 79A into the transmission housing chamber 13 to lubricate the bearing 63 and other rotating components.

Figure 7:
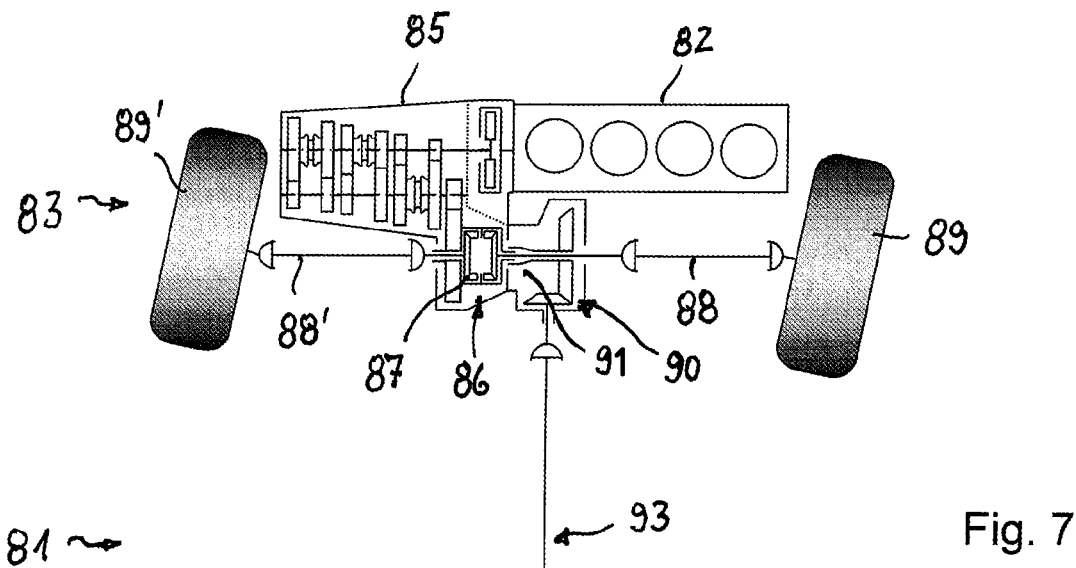
FIG. 7 shows a driveline with the drive assembly according to FIGS. 1 to 6 in a schematic representation.

FIG. 7 shows a driveline arrangement 81 for a multi-axle driven motor vehicle with a drive assembly 2 according to the disclosure. The driveline arrangement 81 includes a power source 82, a first driveline drivable by the power source 82 and having a first drive axle 83, and a second driveline with a second drive axle 84. The power source 82 is designed in the form of an internal combustion engine and drives a power take-off unit 86 (PTU) via a multi-step transmission 85, through which PTU torque is introduced into the first and second driveline.

The first driveline includes a differential drive 87, via which an introduced torque is transmitted to the two sideshafts 88, 88' to drive the associated wheels 89, 89'. The sideshafts 88, 88' each comprise a constant velocity joint on the transmission side and a constant velocity joint on the wheel side, which allow torque transmission under angular movements.

The second driveline can be permanently driven (permanent all-wheel drive) or can be configured to be optionally drivable as required by means of a clutch 91 arranged in the power path (on-demand drive). The second driveline includes a propshaft 93 with which torque can be transmitted to the input part 22 of the drive assembly 2 according to the disclosure. The propshaft 93 can be designed as a multi-part shaft connecting a front angle drive 90 with the input part 22 of the drive assembly 2. The output parts 34, 36 of drive assembly 2 are drivingly connected to a respective sideshaft 92, 92' for transmitting torque to the associated wheels 93, 93'. The drive torque transmittable to the drive axle 84 can be set by the clutch 5, in particular, variably depending on the determined requirement (target torque). When the clutch 5 is disengaged, the sideshafts 92, 92' and the corresponding drive axle 84, are decoupled from the drive. In this operating mode, the reservoir 14 is filled with lubricant so that the lubricant level in the transmission housing chamber 13 and the overall splash losses are reduced.

Figure 8:
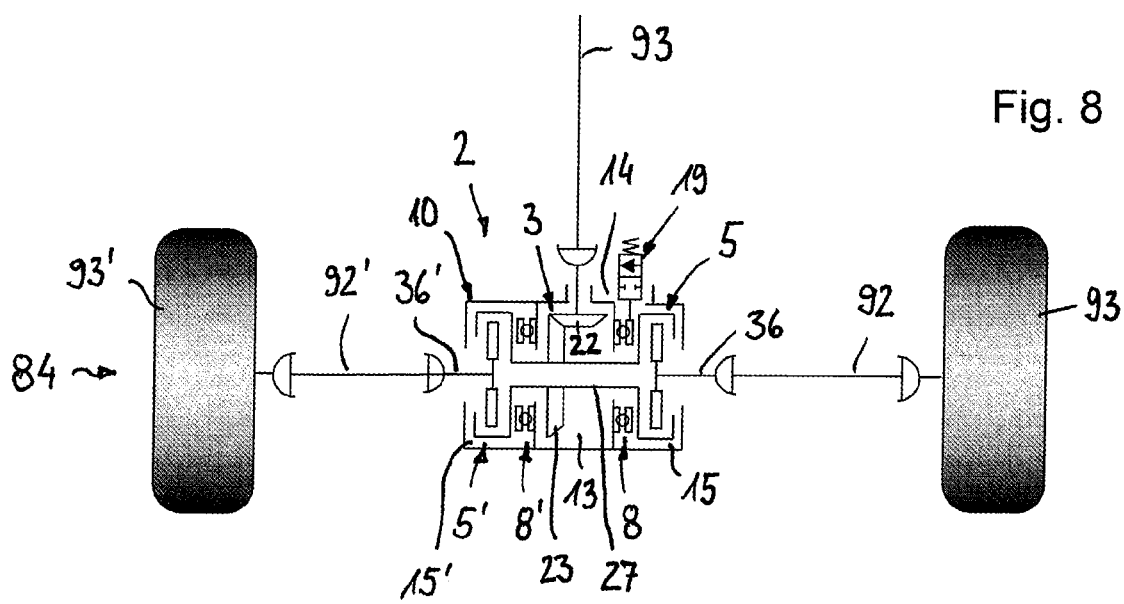
FIG. 8 shows a second example of the drive assembly in a schematic representation.

FIG. 8 shows second example of a drive assembly 2. In terms of structure and mode of operation, the present example largely corresponds to that shown in FIGS. 1 to 7, so that with regard to the common features it is referred to the above description in abbreviated form. The same respectively corresponding details are marked with the same reference signs as in FIGS. 1 to 7.

A difference is that the present example has two clutches 5, 5', via which torque transmission and distribution to the two sideshafts 92, 92' is controlled. The clutches 5, 5' are each individually controllable via an associated actuator 8, 8'. The actuators 8, 8' for the clutches 5, 5' are designed in the same manner as the corresponding components of the above example, to which it is hereby referred in order to avoid repetition. An axle differential is not provided in the present example.

The drive assembly 2 includes the angle drive 3, into which torque can be introduced from a propshaft 93. The part of the driveline arranged in the power path upstream of the angle drive 3 and the propshaft 93 may be configured as in the example shown in FIG. 7. The ring gear 23 of the angle drive 3 is drivingly connected to the two clutch input parts 6, 6' in order to drive them jointly at the same speed. The clutch output parts 7, 7' are connected to the respective sideshaft 92, 92' to drive them. The clutch input parts 6, 6' in the present example are designed as outer plate carriers. Accordingly, the clutch output parts 7, 7' are designed as inner plate carriers.

One of the actuators 8 is operatively connected to the valve 19, which is open when the clutch 5 is engaged so that lubricant flows from the reservoir 14 to the transmission housing chamber 13, and is closed when the clutch 5 is disengaged so that lubricant is stored in reservoir 14. With the present example, the valve 19 can control a flow of lubricant to the transmission housing chamber 13, the first clutch housing chamber 15 and the second clutch housing chamber 15'. Accordingly, no valve 19 is provided at the second clutch 5', although an example with two valves 19—one per actuator 8—would also be possible.

In addition to the disconnect function of the driveline, the present example with two clutches 5, 5' has the further special feature that the torque distribution between the right-hand sideshaft 92 and the left-hand sideshaft 92' can be individually adjusted and controlled. Such an example with one clutch 5, 5' per sideshaft 92, 92' is also called "Twinster".

REFERENCE SIGN 2 drive assembly
3 angle drive/first gearing
4 differential drive/second gearing
5 clutch
6 clutch input part
7 clutch output part
8 actuator
9 actuating element
10 housing
11 actuating contour
12 fluid channel
13 transmission housing chamber
14 reservoir
15 clutch housing chamber
16 fluid channel
17 fluid channel
18 fluid channel
19 valve
20 control element
21 valve chamber
22 first gear
23 second gear
24 bearing
25 bearing
26 shaft splines
27 input part/differential carrier
28 output part/sideshaft gear
29 output part/sideshaft gear
30 differential gears
34 sideshaft
35 intermediate shaft
36 sideshaft
37 plate packet
38 supporting plate
39 pressure plate
42 axial bearing
43 ball ramp mechanism
44 supporting ring
45 setting ring
46 inner seat
47 gear stage
48 pinion
49 teeth
52 spring
53 first section
54 second section
55 fluid orifice
56 supporting element
57 housing part
58 housing part
59 housing part
60 intermediate wall
61 opening
62 bearing
63 bearing
64 shaft bearing
65 ring shoulder
66 annular portion
67 shaft splines
68 first bearing
69 second bearing
70 sleeve part
71 shaft bearing
72 fluid connection
73 orifice
75 fluid connection
76 orifice
77 fluid connection
78 pinion chamber
79 fluid connection
81 driveline arrangement
82 power source
83 first drive axle
84 second drive axle
85 multi-step transmission
86 power take-off unit
87 differential drive
88, 88' sideshaft
89, 89' wheel
90 angle drive
91 clutch
92, 92' sideshaft
A2 axis of rotation

The invention claimed is:

1. A drive assembly for a motor vehicle, comprising:
a housing including a transmission housing chamber, a reservoir, and a clutch housing chamber;
a transmission disposed in the transmission housing chamber, wherein, during operation of the transmission, lubricant is conveyed through rotational movement of a rotating part of the transmission from the transmission housing chamber into the reservoir;
a clutch disposed in the clutch housing chamber and drivingly connected to the transmission;
an actuator including an actuating element acting on the clutch to adjust a torque transmittable between a clutch input part and a clutch output part; and
a valve configured to control a lubricant flow from the reservoir to at least one of the transmission housing chamber and the clutch housing chamber, the valve including a control element that is pretensioned against the actuating element by a spring, wherein the valve is operatively connected to the actuating element of the actuator to allow lubricant flow from the reservoir to at least one of the transmission housing chamber and the clutch housing chamber when the clutch is engaged, and to prevent lubricant flow from the reservoir with some of the lubricant being stored in the reservoir and a lubricant amount circulating in the transmission housing chamber being reduced when the clutch is disengaged, wherein the actuating element, when engaging the clutch, releases the control element so that the control element is transferred into an open position by the spring and a fluid connection from the reservoir to the at least one of the transmission housing chamber and the clutch housing chamber is opened.

2. The drive assembly according to claim 1, wherein the control element is in the closed position when the clutch is disengaged and is in the open position when the clutch is engaged.

3. The drive assembly according to claim 2, wherein the control element is engageable with a fluid orifice, the control element covers the fluid orifice in the closed position, and is spaced from the fluid orifice in the open position.

4. The drive assembly according to claim 2, wherein the actuator includes a ramp mechanism having a supporting ring axially supported against the housing, a setting ring axially displaceable relative to the supporting ring, and a drive unit for rotatingly driving one of the supporting ring and the setting ring relative to the other of the supporting ring and the setting ring, wherein a ramp structure is provided in the supporting ring and the setting ring such that a rotational movement of the drive unit is converted into an axial movement of the setting ring.

5. The drive assembly according to claim 4, wherein the setting ring is the actuating element and is rotatingly drivable by the drive unit.

6. The drive assembly according to claim 2, wherein the actuating element includes an actuating contour engaged with the control element, and the control element is moveable along the actuating contour between the open and closed positions.

7. The drive assembly according to claim 1, further comprising two fluid channels, one fluid channel extending from the reservoir to the transmission housing chamber and the other fluid channel extending from the reservoir to the clutch housing chamber, wherein an opening of the one fluid channel into the reservoir is at a higher level than an opening of the other fluid channel out of the reservoir.

8. The drive assembly according to claim 7, wherein the transmission housing chamber, the reservoir, and the clutch housing chamber are arranged in series.

9. The drive assembly according to claim 7 further comprising a return flow line extending from the reservoir to the transmission.

10. The drive assembly according to claim 7, further comprising a collecting device in the transmission housing, wherein the transmission includes a rotatingly drivable pinion and a ring gear that engages the pinion and is rotatably supported in the housing, and wherein the collecting device is positioned to catch lubricant thrown off the ring gear and to feed the lubricant to the one fluid channel.

11. The drive assembly according to claim 1, wherein the housing has an intermediate wall between the transmission housing chamber and the clutch housing chamber, the intermediate wall has a ring shoulder and an opening through which an intermediate shaft extends from the transmission to the clutch.

12. The drive assembly of claim 11, further comprising a fluid channel extending from the reservoir to the clutch housing chamber, wherein the fluid channel opens into an annular portion of the intermediate wall axially adjacent to the ring shoulder of the intermediate wall.

13. The drive assembly according to claim 11, wherein the actuator is arranged coaxially to the intermediate shaft and axially between the intermediate wall and the clutch.

14. The drive assembly according to claim 11, further comprising a differential drive arranged in the transmission housing chamber, wherein the differential drive includes a differential carrier connected to the transmission and rotatably supported in the housing about an axis of rotation, a plurality of differential gears rotatably supported in the differential carrier and jointly rotating about the axis of rotation, and two sideshaft gears each arranged coaxially to the axis of rotation and engaging the differential gears, wherein a clutch-sided end of the differential carrier is rotatably supported in the intermediate wall.

15. The drive assembly according to claim 1, wherein the reservoir stores at least one of at least 25% or at most 85% of a total lubricant volume of the drive assembly.

16. The drive assembly according to claim 1, wherein the transmission includes a lubricant sump, and the reservoir is arranged at a higher level than the lubricant sump.

17. The drive assembly according to claim 1, further comprising a fluid channel extending from the reservoir to the transmission housing chamber, wherein the reservoir includes a lower wall having a bore, the fluid channel includes a sleeve extending upwardly into the reservoir from the bore.

18. The drive assembly according to claim 1, wherein the clutch is a multi-plate wet clutch and includes a plate packet having inner plates and outer plates, an inner plate carrier, to which the inner plates are connected in a rotationally fixed and axially movable manner, and an outer plate carrier, to which the outer plates are connected in a rotationally fixed and axially movable manner, wherein one of the inner plate carrier and the outer plate carrier includes at least one bore positioned adjacent to the plate packet.

19. The drive assembly according to claim 1 further comprising:
a second clutch drivingly connected with the transmission, and
a second actuator separate from the actuator, the second clutch being moveable by the second actuator.

20. A drive assembly for a motor vehicle, comprising:
a housing including a transmission housing chamber, a reservoir, and a clutch housing chamber, wherein at least one of the transmission housing chamber or the clutch housing chamber are fluidically connected to the reservoir;
a transmission disposed in the transmission housing chamber;
a clutch disposed in the clutch housing chamber and drivingly connected to the transmission;
an actuator including an actuating element engaged with the clutch, the clutch being moveable by the actuating element between a disengaged position and an engaged position; and a valve operatively connected to the actuating element of the actuator to allow lubricant flow from the reservoir to at least one of the transmission housing chamber and the clutch housing chamber when the clutch is in the engaged position and to prevent lubricant flow from the reservoir when the clutch is in the disengaged position;

wherein the valve has a control element movable by the actuating element of the actuator between an open position and a closed position, and the control element is in the closed position when the clutch is in the disengaged position and is in the open position when the clutch is in the engaged position;

wherein the actuating element includes an actuating contour engaged with the control element, and the control element is moveable along the actuating contour between the open and closed positions.

21. A drive assembly for a motor vehicle, comprising:

a housing including a transmission housing chamber, a reservoir, and a clutch housing chamber, wherein at least one of the transmission housing chamber or the clutch housing chamber are fluidically connected to the reservoir;

a transmission disposed in the transmission housing chamber;

a clutch disposed in the clutch housing chamber and drivingly connected to the transmission;

an actuator including an actuating element engaged with the clutch, the clutch being moveable by the actuating element between a disengaged position and an engaged position; a valve operatively connected to the actuating element of the actuator to allow lubricant flow from the reservoir to at least one of the transmission housing chamber and the clutch housing chamber when the clutch is in the engaged position, and to prevent lubricant flow from the reservoir when the clutch is in the disengaged position; and a fluid channel extending from the reservoir to the transmission housing chamber, wherein the reservoir includes a lower wall having a bore, the fluid channel includes a sleeve extending upwardly into the reservoir from the bore.

* * * * *